United States Patent
Sim et al.

(10) Patent No.: US 10,966,046 B2
(45) Date of Patent: Mar. 30, 2021

(54) SPATIAL REPOSITIONING OF MULTIPLE AUDIO STREAMS

(71) Applicant: Creative Technology Ltd, Singapore (SG)

(72) Inventors: Wong Hoo Sim, Singapore (SG); Teck Chee Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 16/213,979

(22) Filed: Dec. 7, 2018

(65) Prior Publication Data

US 2020/0186954 A1 Jun. 11, 2020

(51) Int. Cl.
*H03G 5/00* (2006.01)
*H04S 7/00* (2006.01)
(Continued)

(52) U.S. Cl.
CPC .......... *H04S 7/304* (2013.01); *G06K 9/00362* (2013.01); *G06K 9/00523* (2013.01);
(Continued)

(58) Field of Classification Search
CPC ...... H04S 7/304; H04S 1/005; H04S 2420/01; G06K 9/00362; G06K 9/00523; H04R 3/04; H04R 5/033; H04R 5/04
(Continued)

(56) References Cited

U.S. PATENT DOCUMENTS 7,555,354 B2 6/2009 Walsh et al.
7,840,019 B2 11/2010 Slaney et al.
(Continued)

FOREIGN PATENT DOCUMENTS

FR 3051951 B1 6/2018
SG 10201510822 Y 7/2017
(Continued)

OTHER PUBLICATIONS

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.
(Continued)

*Primary Examiner* — Ammar T Hamid
(74) *Attorney, Agent, or Firm* — Russell Swerdon; Desmund Gean (57) ABSTRACT

An audio rendering system includes a processor that combines audio input signals with personalized spatial audio transfer functions preferably including room responses. The personalized spatial audio transfer functions are selected from a database having a plurality of candidate transfer function datasets derived from in-ear microphone measurements for a plurality of individuals. Alternatively, the personalized transfer function datasets are derived from actual in-ear measurements of the listener. Foreground and background positions are designated and matched with transfer function pairs from the selected dataset for the foreground and background direction and distance. Two channels of input audio such as voice and music are processed. When a voice communication such as a phone call is accepted the music being rendered is moved from a foreground to a background channel corresponding to a background spatial audio position using the personalized transfer functions. The voice call is simultaneously transferred to the foreground channel.

19 Claims, 3 Drawing Sheets

(51) Int. Cl.
- *G06K 9/00* (2006.01)
- *H04R 3/04* (2006.01)
- *H04R 5/033* (2006.01)
- *H04R 5/04* (2006.01)
- *H04S 1/00* (2006.01)
- *H04R 1/40* (2006.01)

(52) U.S. Cl.
CPC ............... *H04R 3/04* (2013.01); *H04R 5/033* (2013.01); *H04R 5/04* (2013.01); *H04S 1/005* (2013.01); *H04S 2420/01* (2013.01)

(58) Field of Classification Search
USPC ...................................................... 381/98, 97
See application file for complete search history.

(56) References Cited

U.S. PATENT DOCUMENTS

| | | | |
|---|---|---|---|
| 7,936,887 | B2 | 5/2011 | Smyth |
| 9,030,545 | B2 | 5/2015 | Pedersen |
| 9,544,706 | B1 | 1/2017 | Hirst |
| 9,584,946 | B1* | 2/2017 | Lyren ............... H04M 1/0202 |
| 9,602,947 | B2 | 3/2017 | Oh et al. |
| 10,225,682 | B1 | 3/2019 | Lee et al. |
| 2007/0270988 | A1 | 11/2007 | Goldstein et al. |
| 2008/0170703 | A1* | 7/2008 | Zivney ............. H04M 1/72563 381/2 |
| 2012/0008806 | A1* | 1/2012 | Hess ...................... H04R 1/345 381/302 |
| 2012/0183161 | A1 | 7/2012 | Agevik et al. |
| 2015/0073262 | A1 | 3/2015 | Roth et al. |
| 2015/0124975 | A1* | 5/2015 | Pontoppidan ......... G06F 3/0486 381/23.1 |
| 2015/0312694 | A1 | 10/2015 | Bilinski et al. |
| 2015/0373477 | A1* | 12/2015 | Norris ............... H04M 1/72572 381/303 |
| 2015/0382127 | A1* | 12/2015 | Sun .......................... H04S 7/30 381/17 |
| 2016/0379041 | A1 | 12/2016 | Rhee et al. |
| 2017/0048641 | A1* | 2/2017 | Franck ................. G10L 19/022 |
| 2017/0257723 | A1 | 9/2017 | Morishita et al. |
| 2018/0091920 | A1 | 3/2018 | Family |
| 2018/0218507 | A1 | 8/2018 | Hyllus et al. |
| 2018/0249279 | A1 | 8/2018 | Karapetyan et al. |
| 2019/0215637 | A1 | 7/2019 | Lee et al. |

FOREIGN PATENT DOCUMENTS

| | | |
|---|---|---|
| WO | 2017041922 A1 | 3/2017 |
| WO | 2017116308 A1 | 7/2017 |
| WO | 2017/202634 A1 | 11/2017 |

OTHER PUBLICATIONS

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Seguier, "Pinna Morphological Parameters Influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 3D statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Externalisation of Non-individualised HRTFs by Cluster Analysis," Audio Engineering Society's 133rd Convention Paper, Oct. 26-29, 2012, San Francisco, CA.

Meshram et al., "P-HRTF: Efficient Personalized HRTF Computation for High-Fidelity Spatial Sound," 2014 IEEE International Symposium on Mixed and Augmented Reality (ISMAR), 2014, pp. 53-61, Munich, Germany.

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models—Their Training and Application," Computer Vision and Image Understanding, Jan. 1995, pp. 38-59, vol. 61, No. 1, Manchester, England.

Zotkin, Dmitry et al., HRTF Personalization Using Anthropometric Measurements, 2003 IEEE Workshop on Applications of Signal Processing to Audio and Acouistics, Oct. 19-22, 2003, p. 157-160, New Paltz, NY.

Karapetyan et al., Elevation Control in Binaural Rendering, Jun. 4-7, 2016, pp. 1-4, Audio Engineering Society, 140th Convention e-Brief 270, Paris, France.

* cited by examiner

SPATIAL REPOSITIONING OF MULTIPLE AUDIO STREAMS

CROSS REFERENCES TO RELATED APPLICATIONS

This application incorporates by reference in their entirety to the disclosures from U.S. patent application Ser. No. 62/614,482, filed Jan. 7, 2018, and titled, METHOD FOR GENERATING CUSTOMIZED SPATIAL AUDIO WITH HEAD TRACKING; International Application No. PCT/SG2016/050621, filed Dec. 28, 2016 and entitled "A METHOD FOR GENERATING A CUSTOMIZED/PERSONALIZED HEAD RELATED TRANSFER FUNCTION", which claims the benefit of priority from Singapore Patent Application No. 10201510822Y, filed Dec. 31, 2015 and entitled "A METHOD FOR GENERATING A CUSTOMIZED/PERSONALIZED HEAD RELATED TRANSFER FUNCTION", the entirety of which are incorporated by reference for all purposes. This application further incorporates by reference in their entirety the disclosures from U.S. patent application Ser. No. 15/969,767 filed on May 2, 2018 and titled SYSTEM AND A PROCESSING METHOD FOR CUSTOMIZING AUDIO EXPERIENCE; and U.S. patent application Ser. No. 16/136,211 filed on Sep. 19, 2018, and titled METHOD FOR GENERATING CUSTOMIZED SPATIAL AUDIO WITH HEAD TRACKING.

BACKGROUND OF THE INVENTION

1. Field of the Invention

The present invention relates to methods and systems for generating audio for rendering over headphones. More particularly, the present invention relates to using databases of personalized spatial audio transfer functions having room impulse response information associated with spatial audio positions together with audio streams and generating spatial audio positions using the personalized spatial audio transfer functions to create more realistic audio rendering over headphones.

2. Description of the Related Art

Often a user is listening to music on his phone when a phone call comes in and may wish the music to continue uninterrupted. Unfortunately, most phones are configured to mute the music when the call is accepted. What is needed is an improved system that allows the music or other audio to continue uninterrupted when the call is accepted and also allows for allowing the user to distinguish between the two different audio sources.

SUMMARY OF THE INVENTION

To achieve the foregoing, the present invention provides in various embodiments a processor and system configured to provide binaural signals to headphones, the system including means for placing audio in a first input audio channel in a first position, such as a foreground position, and means for placing audio in a second input audio channel in a second position, such as a background position.

In some of the embodiments of the present invention, the system includes databases of personalized spatial audio transfer functions having room impulse response information (such as HRTFs or BRIRs) associated with spatial audio positions together with at least two audio streams. Together the personalized BRIRs for at least two locations are used with the two input audio streams to establish a foreground spatial audio source and a background spatial audio source to provide an immersive experience for the listener through headphones.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

Binaural technology, which generally refers to technology relating to or used with both ears, enables the user to perceive audio in a three-dimensional field. This is accomplished in some embodiments through the determination and use of the Binaural Room Impulse Response (BRIR) and its related Binaural Room Transfer Function (BRTF). The BRIR simulates the interaction of sound waves from a loudspeaker with the listener's ears, head and torso, as well as with the walls and other objects in the room. Alternatively, the Head Related Transfer Function (HRTF) is used in some embodiments. The HRTF is a transfer function in the frequency domain corresponding to the impulse responses representing the interactions in an anechoic environment. That is, the impulse responses here represent the sound interactions with listener ears, head and torso.

According to known methods for determining HRTFs or BRTFs, a real or dummy head and binaural microphones are used to record a stereo impulse response (IR) for each of a number of loudspeaker positions in a real room. That is, a pair of impulse responses, one for each ear, is generated for each position. This pair is referred to as the BRIR. A music track or other audio stream may then be convolved (filtered) using these BRIRs and the results mixed together and played over headphones. If the correct equalization is applied, the channels of the music will then sound as if they were being played in the speaker positions in the room where the BRIRs were recorded.

Often a user is listening to music on his phone when a phone call comes in and the user may wish the music to continue uninterrupted when the call is accepted. Rather than invoking a mute function, the two separate audio signals, i.e., the phone call and the music, can be fed into the same channel(s). But generally, humans have difficulty distinguishing sound sources that come from the same direction. To solve this problem, and in accordance with one embodiment, when an incoming call comes in, the music is directed from a first position to a speaker or channel in a second position such as a background position, i.e., the music and voice communication are placed in different positions. Unfortunately, while these methods of positioning rendered audio streams when used with multi-speaker setups allow separation of the sources, a large percentage of voice communications today come in over mobile phones, which are not usually connected to multichannel speaker setups. Furthermore, even such methods used with multichannel setups sometimes provide a less than optimal result when the audio sources are designated by panning for positions that are not completely aligned with the physical positions of the loudspeakers. This is due in part to the difficulties for listeners in precisely localizing spatial audio positions when such positions are approximated by traditional panning methods to move the perceived audio position to a location between multichannel speaker positions.

The present invention solves these problems of voice communication over headphones by automatically positioning the voice call and the music in different spatial audio positions by using positions virtualized using transfer functions that at least simulate the effects from at least an individual's head, torso, and ears on the audio such as by using HRTFs. More preferably, room effects on the audio are considered by processing the audio streams with BRIRs. But commercially available BRIR datasets that are non-individualized give most users a poor sense of directionality and an even poorer sense of distance of the perceived sound sources. This might cause difficulty in distinguishing sound sources.

To solve these additional issues, the present invention in some embodiments uses individualized BRIRs. In one embodiment, the generation of individualized HRTF or BRIR datasets are generated by inserting microphones in the listener's ears and recording the impulse responses in a recording session. This is a time-consuming process that may be inconvenient for inclusion in the sale of mobile phones or other audio units. In further embodiments, the voice and music sound sources are localized at separate first (e.g, foreground) and second (e.g. background) locations using individualized BRIRs (or associated BRTFs) derived from the extraction of image-based properties for each individual listener, said properties used to determine a suitable individualized BRIR from a database having a candidate pool of individualized spatial audio transfer functions for a plurality of measured individuals. The individualized BRIRs corresponding to each of the at least two separate spatial audio positions is preferably used to direct a first and second audio stream to two different spatial audio positions.

Further still, since it is known that humans are better able to distinguish two sound sources when one is determined by the listener to be closer and another is determined to be farther away, in some embodiments the music is automatically placed at a distance in the background spatial position and the voice is placed at a nearer distance using individualized BRIRs derived using the extracted image-based properties.

In one further embodiment, the extracted image-based properties are generated by the mobile phone. In another embodiment, upon determination that the voice call is of a lower priority, the voice call is directed from the foreground to the background and the music to the foreground upon receipt of a control signal from the listener, such as generated by activating a switch. In yet another embodiment, upon determination that the voice call is of a lower priority and upon receipt of a control signal from the listener, the apparent distance of the voice call is increased and the apparent distance of the music is decreased using individualized BRIRs corresponding to different distances for the same directions.

Figure 3:
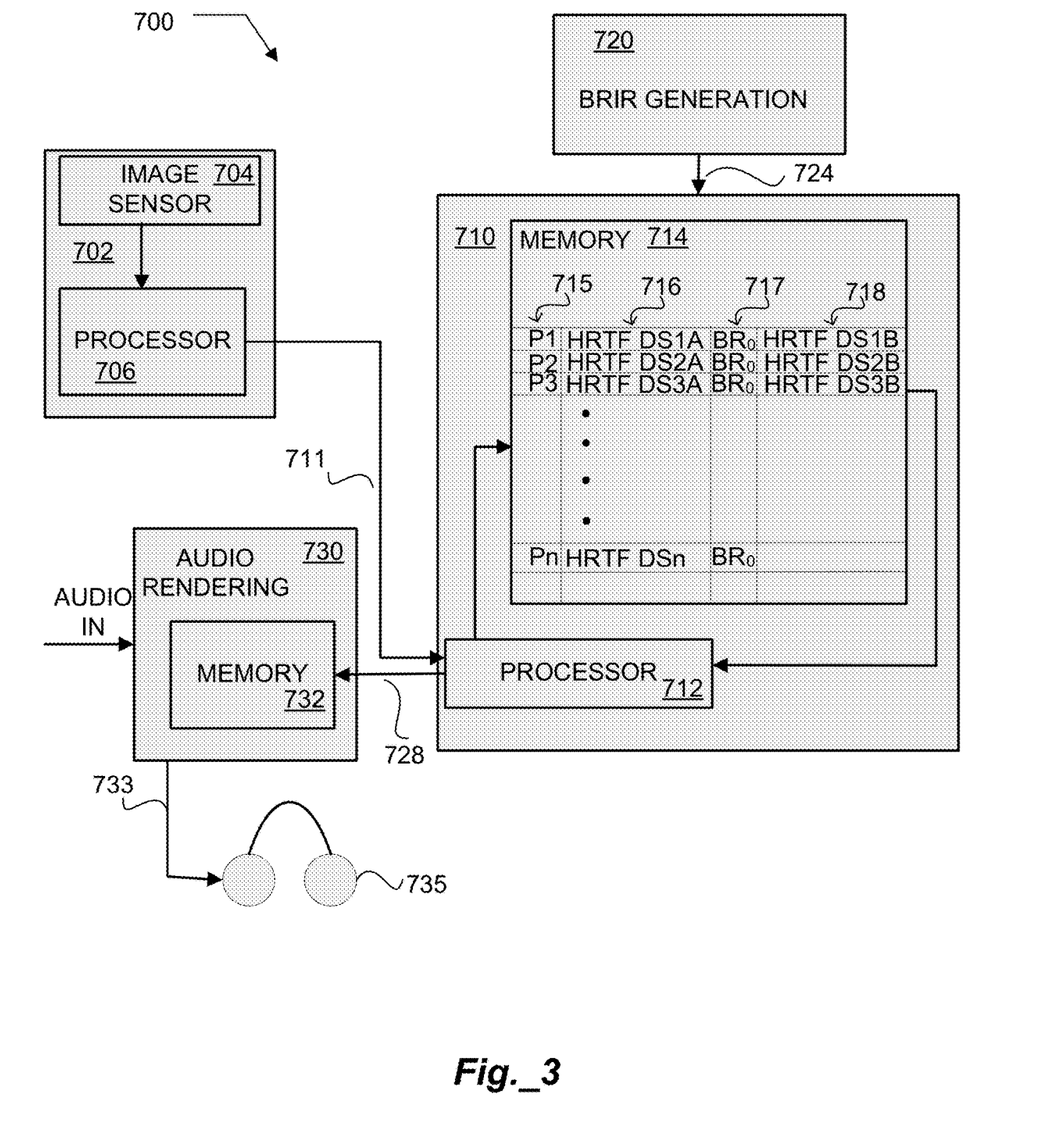
FIG. 3 is a diagram illustrating a system for generating BRIRs for customization, acquiring listener properties for customization, selecting customized BRIRs for listeners, and for rendering audio modified by BRIRs in accordance with embodiments of the present invention.

While it should be understood that most of the embodiments herein describe the personalized BRIRs in use with headphones, the techniques for positioning media streams in conjunction with voice communications described can also be extended to any suitable transfer functions customized for the user in accordance with the steps described with respect to FIG. 3.

It should be understood that the scope of the present invention is intended to cover placing the respective first audio source and the voice communication at any position around the user. Further, the use herein of foreground and background is not intended to be limited to respectively areas in front of the listener or behind the listener. Rather, foreground is to be interpreted in its most general sense as referring to the more prominent or important of the two separate positions and in turn background referring to the less prominent of the separate positions. Further still, it should be noted that the scope of the present invention occurs in the very general sense directing the first audio stream to a first location and the second audio stream to a second spatial audio position using the HRTFs or BRIRs in accordance with the techniques described herein. It should be further noted that some embodiments of the invention can extend to the selection of any directional location around the user for either of the foreground or background positions with the simultaneous application of attenuation of signals in lieu of assigning a closer distance to the foreground position and a farther distance to a background position. In its simplest form, filtering circuitry applying two pairs of BRIRs to represent foreground and background positions will be initially shown in accordance with embodiments of the present invention.

Figure 1:
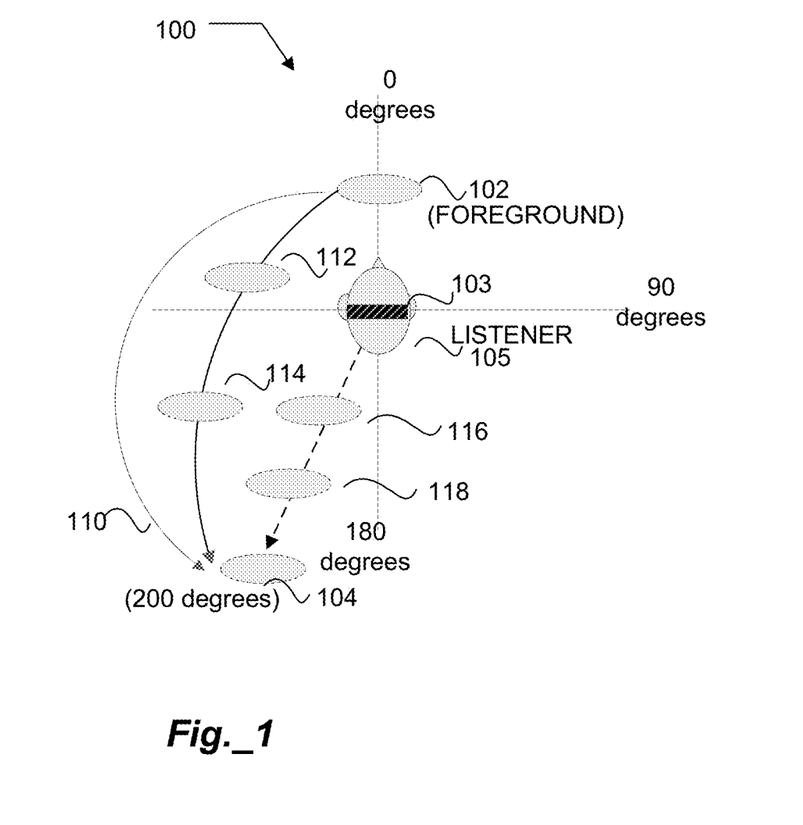
FIG. 1 is a diagram illustrating spatial audio positions for audio processed in accordance with some embodiments of the present invention.

FIG. 1 is a diagram illustrating spatial audio positions for audio processed in accordance with some embodiments of the present invention. Initially a listener 105 may be listening through headphones 103 to a first audio signal such as music. Using BRIRs applied to the first audio stream the listener senses that the first audio stream is coming from a first audio position 102. In some embodiments this is a foreground position. One technique, in one embodiment, places this foreground position at the zero-degree position relative to the listener 105. When a triggering event occurs, such as in one embodiment the receipt of a phone call, the second stream (e.g., the voice communication or phone call) is routed to the first position (102) while the first audio signal is routed to a second position 104. In the example embodiment shown, this second position is placed at the 200-degree position, which in some embodiments is described as a less prominent or background position. The 200-degree position is selected only as a non-limiting example. Placement of the audio stream at this second position is achieved preferably using BRIRs (or BRTFs) that correspond to the azimuth, elevation, and distance for this second position for the listener of interest.

In one embodiment, the transition of the first audio stream to the second position (e.g., background) occurs abruptly without providing any sense that the first audio stream is moving through intermediate spatial positions. This is depicted graphically by path 110, which shows no intermediate spatial positions. In another embodiment, the audio is positioned at intermediate points 112 and 114 for short transitory time periods to provide the sense of movement directly or alternatively in an arc from the foreground position 102 to background position 104. In a preferred embodiment BRIRs for the intermediate positions 112 and 114 are used to spatially position the audio streams. In alternative embodiments, the sense of movement is achieved by using BRIRs for the foreground and background positions and panning between those virtual loudspeakers corresponding to those foreground and background positions. In some embodiments, the user may recognize that the voice communication (e.g., phone call) is not deserving of priority status and choose to relegate the phone call to a second position (e.g. a background position) or even to a user selected third position and the music back to a first (e.g., foreground) position. In one embodiment this is performed by sending the audio stream corresponding to music back to the foreground (first) position 102 and sending the voice communication to the background position 104. In another embodiment this reranking of priorities is performed by making the voice call more distant and the music closer to the listener head 105. This is preferably done by assigning a new HRTF or BRTF for the listener captured at different distances, calculated or interpolated from the captured measurements to represent the new distances. For example, in order to increase the priority of the music from background position 104, the apparent distance may be decreased to either spatial audio position 118 or 116. This reduced distance, accomplished preferably by processing the music audio stream with new HRTFs or BRTFs increases the volume of the music in relation to the voice communication signal. The voice signal may simultaneously in some embodiments be increased in distance from the listener head 105, again either from the selection of captured HRTF/BRTF values or interpolated. The interpolation/calculation may be done using more than 2 points. For example, to get a point which is an intersection of two lines (AB and CD), the interpolation/calculation may require the points A, B, C, and D.

Alternatively, the spatial audio position generating the voice communication may be maintained at a stationary position during the reranking steps or increased. In some embodiments, the two separate audio streams enjoy equal prominence.

In yet other embodiments, the user can choose from a user interface spatial audio positions for at least one of the streams, more preferably, single or multiple locations for all of the streams.

Figure 2:
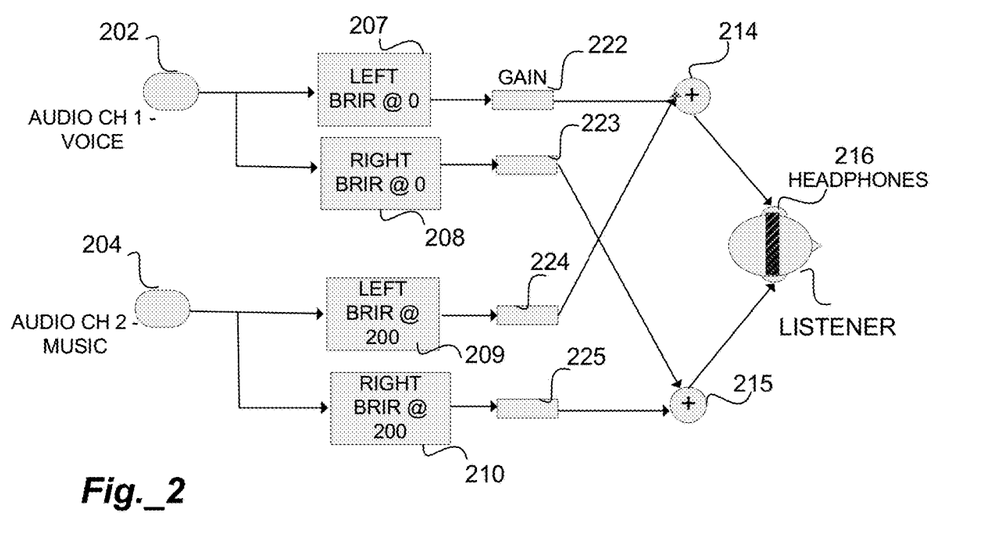
FIG. 2 is a diagram illustrating a system for presenting an audio source such as from any of several different types of media and a voice communication at different spatial audio locations in accordance with some embodiments of the present invention.

FIG. 2 is a diagram illustrating a system for simulating an audio source and a voice communication at different spatial audio locations in accordance with some embodiments of the present invention. FIG. 2 depicts generally two different streams (202 and 204) entering the spatial audio positioning system by using separate pairs of filters (i.e., filters 207, 208) for a first spatial audio position and filters 209, 210 for a second spatial audio position. Gain 222-225 may be applied to all of the filtered streams before the signals respectively for the left headphone cup are added on adder 214 and the filtered results for the right headphone cup of headphone 216 are similarly added in adder 215. While this collection of hardware modules shows the basic principals involved, other embodiments use BRRIs or HRTFs stored in memory such as memory 732 of audio rendering module 730 (such as a mobile phone) as illustrated in FIG. 3. In some embodiments the listener is aided in discerning between the first and second spatial audio positions by the fact that those spatial audio positions are generated by selecting transfer functions having room responses in addition to the HRTFs for the individuals. In preferred embodiments, the first and second positions are determined using BRIRs customized for the listener.

The systems and methods for rendering over headphones work best when the HRTF or BRTF is individualized for the listener by either direct in-ear microphone measurement or alternatively individualized BRIR/HRIR datasets where in-ear microphone measurements are not used. In accordance with preferred embodiments of the present invention, one custom method for generating the BRIRs is used which involves the extraction of image-based properties from a user and determining a suitable BRIR from a candidate pool of BRIRs as depicted generally by FIG. 3. In further detail, FIG. 3 illustrates a system for generating HRTFs for customization use, acquiring listener properties for customization, selecting customized HRTFs for listeners, providing rotation filters adapted to work with relative user head movement and for rendering audio as modified by BRIRs in accordance with embodiments of the present invention. Extraction Device 702 is a device configured to identify and extract audio related physical properties of the listener. Although block 702 can be configured to directly measure those properties (for example the height of the ear) in preferred embodiments the pertinent measurements are extracted from images taken of the user, to include at least the user's ear or ears. The processing necessary to extract those properties preferably occurs in the Extraction Device 702 but could be located elsewhere as well. For a non-limiting example, the properties could be extracted by a processor in remote server 710 after receipt of the images from image sensor 704.

In a preferred embodiment, image sensor 704 acquires the image of the user's ear and processor 706 is configured to extract the pertinent properties for the user and sends them to remote server 710. For example, in one embodiment, an Active Shape Model can be used to identify landmarks in the ear pinnae image and to use those landmarks and their geometric relationships and linear distances to identify properties about the user that are relevant to generating a customized BRIR from a collection of stored BRIR datasets, that is, from a candidate pool of BRIR datasets. In other embodiments an RGT model (Regression Tree Model) is used to extract properties. In still other embodiments, machine learning such as neural networks and other forms of artificial intelligence (AI) are used to extract properties. One example of a neural network is the Convolutional neural network. A full discussion of several methods for identifying unique physical properties of the new listener is described in Application PCT/SG2016/050621, filed on Dec. 28, 2016 and titled "A Method for Generating a customized Personalized Head Related Transfer Function", which disclosure is incorporated fully by reference herein.

The remote server 710 is preferably accessible over a network such as the internet. The remote server preferably includes a selection processor 710 to access memory 714 to determine the best matched BRIR dataset using the physical properties or other image related properties extracted in Extraction Device 702. The selection processor 712 preferably accesses a memory 714 having a plurality of BRIR datasets. That is, each dataset in the candidate pool will have an BRIR pair preferably for each point at the appropriate angles in azimuth and elevation and perhaps also head tilt. For example, measurements may be taken at every 3 degrees in azimuth and elevations to generate BRIR datasets for the sampled individuals making up the candidate pool of BRIRs.

As discussed earlier, these are preferably derived by measurement with in ear microphones on a population of moderate size (i.e., greater than 100 individuals) but can work with smaller groups of individuals and stored along with similar image related properties associated with each BRIR set. These can be generated in part by direct measurement and in part by interpolation to form a spherical grid of BRIR pairs. Even with the partially measured/partially interpolated grid, further points not falling on a grid line can be interpolated once the appropriate azimuth and elevation values are used to identify an appropriate BRIR pair for a point from the BRIR dataset. For example, any suitable interpolation method may be used including but not limited to the adjacent linear interpolation, bilinear interpolation, and spherical triangular interpolation, preferably in the frequency domain.

Each of the BRIR Datasets stored in memory 714 in one embodiment includes at least an entire spherical grid for a listener. In such case, any angle in azimuth (on a horizontal plane around the listener, i.e. at ear level) or elevation can be selected for placement of the sound source. In other embodiments the BRIR Dataset is more limited, in one instance limited to the BRIR pairs necessary to generate loudspeaker placements in a room conforming to a conventional stereo setup (i.e., at +30 degrees and −30 degrees relative to the straight ahead zero position or, in another subset of a complete spherical grid, speaker placements for multichannel setups without limitation such as 5.1 systems or 7.1 systems.

The HRIR is the head-related impulse response. It completely describes the propagation of sound from the source to the receiver in the time domain under anechoic conditions. Most of the information it contains relates to the physiology and anthropometry of the person being measured. HRTF is the head-related transfer function. It is identical to the HRIR, except that it is a description in the frequency domain. BRIR is the binaural room impulse response. It is identical to the HRIR, except that it is measured in a room, and hence additionally incorporates the room response for the specific configuration in which it was captured. The BRTF is a frequency-domain version of the BRIR. It should be understood that in this specification that since BRIRs are easily transposable with BRTFs and likewise, that HRIRs are easily transposable with HRTFs, that the invention embodiments are intended to cover those readily transposable steps even though they are not specifically described here. Thus, for example, when the description refers to accessing another BRIR dataset it should be understood that accessing another BRTF is covered.

FIG. 3 further depicts a sample logical relationship for the data stored in memory. The memory is shown including in column 716 BRIR Datasets for several individuals (e.g., HRTF DS1A, HRTF DS2A, etc.) These are indexed and accessed by properties associated with each BRIR Dataset, preferably image related properties. The associated properties shown in column 715 enable matching the new listener properties with the properties associated with the BRIRs measured and stored in columns 716, 717, and 718. That is, they act as an index to the candidate pools of BRIR Datasets shown in those columns. Column 717 refers to a stored BRIR at reference position zero and is associated with the remainder of the BRIR Datasets and can be combined with rotation filters for efficient storage and processing when the listener head rotation is monitored and accommodated. Further description of this option is described in detail in co-pending application Ser. No. 16/136,211, filed Sep. 19, 2018, and titled, METHOD FOR GENERATING CUSTOMIZED SPATIAL AUDIO WITH HEAD TRACKING, which is incorporated fully by reference herein.

In general, one objective of accessing the candidate pool of BRIR (or HRTF) datasets is to generate a customized audio response characteristic for a person (such as a BRIR dataset). In some embodiments, these are used to process the input audio signals such as the voice communication and the media streams to position them for the accurate perception of spatial audio associated with the first position and the second position, as described above. In some embodiments, generating this customized audio response characteristic such as the individualized BRIRs includes extracting image related properties such as biometric data for the individual. For example, this biometric data can include data related to the pinna of the ear, the person's ear in general, head, and/or shoulders. In further embodiments, processing strategies such as (1) multiple match; (2) multiple-recognizer types; and (3) cluster based are used to generate intermediate datasets that are later combined (where multiple hits result) to produce the customized BRIR dataset for the individual. These can be combined by using weighted sums among other methods. In some cases there is no need to combine the intermediate results where there is only a single match. In one embodiment, the intermediate datasets are based at least in part on the closeness of the match of a retrieved BRIR dataset (from the candidate pool) with respect to extracted properties. In other embodiments multiple recognizer matching steps are used whereby the processor retrieves one or more datasets based on a plurality of training parameters corresponding to the biometric data. In still other embodiments, a cluster based processing strategy is used whereby potential datasets are clustered based on the extracted data (e.g. biometric data). The clusters comprise multiple datasets having a relationship where they are clustered or grouped together to form a model with a corresponding BRIR dataset that matches the extracted data (e.g. biometric) from the image.

In some embodiments of the present invention 2 or more distance spheres are stored. This refers to a spherical grid generated for 2 different distances from the listener. In one embodiment, one reference position BRIR is stored and associated for 2 or more different spherical grid distance spheres. In other embodiments each spherical grid will have its own reference BRIR to use with the applicable rotation filters. Selection processor 712 is used to match the properties in the memory 714 with the extracted properties received from Extraction device 702 for the new listener. Various methods are used to match the associated properties so that correct BRIR Datasets can be derived. As described above, these include comparing biometric data by Multiple-match based processing strategy; Multiple recognizer processing strategy; Cluster based processing strategy and others as described in U.S. patent application Ser. No. 15/969,767, titled "SYSTEM AND A PROCESSING METHOD FOR CUSTOMIZING AUDIO EXPERIENCE", and filed on May 2, 2018, which disclosure is incorporated fully by reference herein. Column 718 refers to sets of BRIR Datasets for the measured individuals at a second distance. That is, this column posts BRIR datasets at a second distance recorded for the measured individuals. As a further example, the first BRIR datasets in column 716 may be taken at 1.0 m to 1.5 m whereas the BRIR datasets in column 718 may refer to those datasets measured at 5 m. from the listener. Ideally the BRIR Datasets form a full spherical grid but the present invention embodiments apply to any and all subsets of a full spherical grid including but not limited to a subset containing BRIR pairs of a conventional stereo set; a 5.1 multichannel setup; a 7.1 multichannel setup, and all other variations and subsets of a spherical grid, including BRIR pairs at every 3 degrees or less both in azimuth and elevation as well as those spherical grids where the density is irregular. For example, this might include a spherical grid where the density of the grid points is much greater in a forward position versus those in the rear of the listener. Moreover, the arrangement of content in the columns 716 and 718 apply not only to BRIR pairs stored as derived from measurement and interpolation but also to those that are further refined by creating BRIR datasets that reflect conversion of the former to an BRIR containing rotation filters.

After the determination of one or more matching or computed BRIR Datasets, the datasets are transmitted to Audio Rendering Device 730 for storage of the entire BRIR Dataset determined by matching or other techniques as described above for the new listener, or, in some embodiments, a subset corresponding to selected spatialized audio locations. The Audio Rendering Device then selects in one embodiment the BRIR pairs for the azimuth or elevation locations desired and applies those to the input audio signal to provide spatialized audio to headphones 735. In other embodiments the selected BRIR datasets are stored in a separate module coupled to the audio rendering device 730 and/or headphones 735. In other embodiments, where only limited storage is available in the rendering device, the rendering device stores only the identification of the associated property data that best match the listener or the identification of the best match BRIR Dataset and downloads the desired BRIR pair (for a selected azimuth and elevation) in real time from the remote sever 710 as needed. As discussed earlier, these BRIR pairs are preferably derived by measurement with in ear microphones on a population of moderate size (i.e., greater than 100 individuals) and stored along with similar image related properties associated with each BRIR data set. Rather than taking all 7200 points, these can be generated in part by direct measurement and in part by interpolation to form a spherical grid of BRIR pairs. Even with the partially measured/partially interpolated grid, further points not falling on a grid line can be interpolated once the appropriate azimuth and elevation values are used to identify an appropriate BRIR pair for a point from the BRIR dataset.

Once the custom selected HRTF or BRIR datasets are selected for the individual, these individualized transfer functions are used to enable the user or the system to provide at least first and second spatial audio positions for positioning the respective media stream and voice communication. In other words, a pair of transfer functions are used for each of the first and second spatial audio positions to virtually place those streams and thereby to enable the listener to focus on his preferred audio stream (e.g., the phone call or the media stream) due to their separate spatial audio positions. The scope of the present invention is intended to cover all media streams including without limitation audio associated with videos, and music.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An audio processing device for processing an event by using a spatial audio position transfer function dataset, the device comprising:

an audio rendering module configured to position $1^{st}$ and $2^{nd}$ audio signals respectively comprising at least a voice communication stream and a media stream in selected ones of at least a first spatial audio position and a second spatial audio position, each of the first and second spatial audio positions rendered by using respective first and second transfer functions from the spatial audio position transfer function dataset;

a monitoring module to monitor initiation of a voice communication event, the event comprising receipt of a phone call, and upon initiation of the phone call, processing the first and second audio signals by positioning the voice communication to the first spatial audio position and transitioning the media stream from an initial spatial audio position to the second spatial audio position;

an output module configured for rendering the resultant audio over two output channels to a coupled pair of headphones; and wherein the audio rendering module is configured to receive from a selection processor a spatial audio position transfer function personalized for the individual from a memory having a candidate pool of a plurality of spatial audio position transfer function datasets that have been provided for a population of individuals, the spatial audio position transfer function datasets each indexed by their corresponding image based audio related physical properties.

2. The audio processing device as recited in claim 1 wherein the spatial audio position transfer function dataset is one of an HRIR dataset or a BRIR dataset customized for an individual and wherein the initial spatial audio position is the first spatial audio position.

3. The audio processing device as recited in claim 1 wherein the selection processor determines the individualized BRIR dataset by accessing the candidate pool by comparing the extracted image based audio related physical properties for the individual against the extracted image based properties for the candidate pool, to identify one or more BRIR datasets based on a closeness metric.

4. The audio processing device as recited in claim 2 wherein the first and second spatial audio positions from the determined individualized BRIR dataset are derived by interpolation or other computation methods from a captured dataset in the memory and wherein the first and second spatial audio positions comprise respectively foreground and background positions.

5. The audio processing device as recited in claim 4 wherein upon determination by the individual listener that the voice call is of a lower priority and generation of a corresponding control signal, the voice call is directed to the background position and the music to the foreground position.

6. The audio processing device as recited in claim 2 wherein upon determination by the individual listener that the voice call is of a lower priority and generation of a corresponding control signal, the apparent distance of the voice call is increased and the apparent distance of the music is decreased using individualized BRIRs corresponding to different distances for the same directions.

7. The audio processing device as recited in claim 2 wherein the positioning of the voice communication to the first spatial audio position and the transitioning of the media stream to the second spatial audio position is performed in an abrupt manner.

8. The audio processing device as recited in claim 2 further including a portable image capturing device configured for acquiring the input image and wherein the audio processing device is one of a mobile phone, communication device, or tablet that captures the image and extracts the image-based properties.

9. The audio processing device as recited in claim 1 wherein the audio processing device is configured to reposition the media stream to the first spatial audio position upon termination of the voice communication stream.

10. The audio processing device as recited in claim 1 wherein the media stream comprises music.

11. The audio processing device as recited in claim 1 wherein the apparent distance of the voice call is increased and the apparent distance of the music is decreased using respective first and second spatial audio position sound transfer functions from the individualized BRIRs corresponding to different distances for the same directions.

12. The audio processing device as recited in claim 1 wherein the output module is coupled to the headphone via one of a wireless connection and a wired connection.

13. The audio processing device as recited in claim 1 wherein the output module includes a digital to analog converter and the coupling to the headphones is through an analog port.

14. The audio processing device as recited in claim 1 wherein the output module is configured to pass a digital signal to the headphones and the headphones include a digital to analog converter.

15. The audio processing device as recited in claim 1 further comprising a user interface configured for choosing a location for at least one of the first spatial audio position and the second spatial audio position.

16. A method for processing audio streams to a set of headphones comprising:

positioning $1^{st}$ and $2^{nd}$ audio signals respectively comprising at least a voice communication stream and a media stream in selected ones of at least a first spatial audio position and a second spatial audio position, each of the first and second spatial audio positions rendered by using respective first and second transfer functions from a spatial audio position transfer function dataset;

monitoring initiation of a voice communication event, the event comprising receipt of a phone call, and upon initiation of the phone call processing the first and second audio signals by positioning the voice communication to the first spatial audio position and transitioning the media stream from an initial spatial audio position to the second spatial audio position wherein at least an associated room impulse response is present in the second transfer function for the second spatial audio position; and rendering the resultant audio over two output channels to a coupled pair of headphones, wherein the spatial audio position transfer function dataset is one of an HRIR or a BRIR dataset customized for an individual and wherein the initial spatial audio position is the first spatial audio position, and wherein the customization includes extracting image-based audio related physical properties for the individual from an input image and transmitting the image based properties to a selection processor configured to determine an individualized BRIR dataset from a memory having a candidate pool of a plurality of BRIR datasets that have been provided for a population of individuals, the BRIR datasets each associated with their corresponding image based properties.

17. The method as recited in claim 16 wherein determining the individualized BRIR dataset comprises interpolation between existing BRIR datasets in the candidate pool.

18. A method for rendering audio streams comprising:

acquiring a first and second spatial audio transfer function customized for an individual from a database comprising a candidate pool of spatial audio transfer functions for a population of individuals, each spatial audio transfer function indexed according to extracted image based biometric properties;

positioning $1^{st}$ and $2^{nd}$ audio signals respectively comprising at least a voice communication stream and a media stream in selected ones of at least a first virtual audio position and a second virtual audio position, each of the first and second virtual audio positions rendered by using respect spatial audio transfer functions customized for an individual; and transitioning the media stream and the voice communication stream between the first and second virtual audio positions based upon a triggering event.

19. The method as recited in claim 18 wherein the triggering event is one of a receipt of a phone call and the termination of a phone call.

* * * * *